T. L. MYERS.
DEVICE FOR USE IN THE MANUFACTURE OF ARTICLES FROM TENDER CLAY.
APPLICATION FILED MAR. 1, 1918.
1,403,440.
Patented Jan. 10, 1922.
2 SHEETS—SHEET 1.
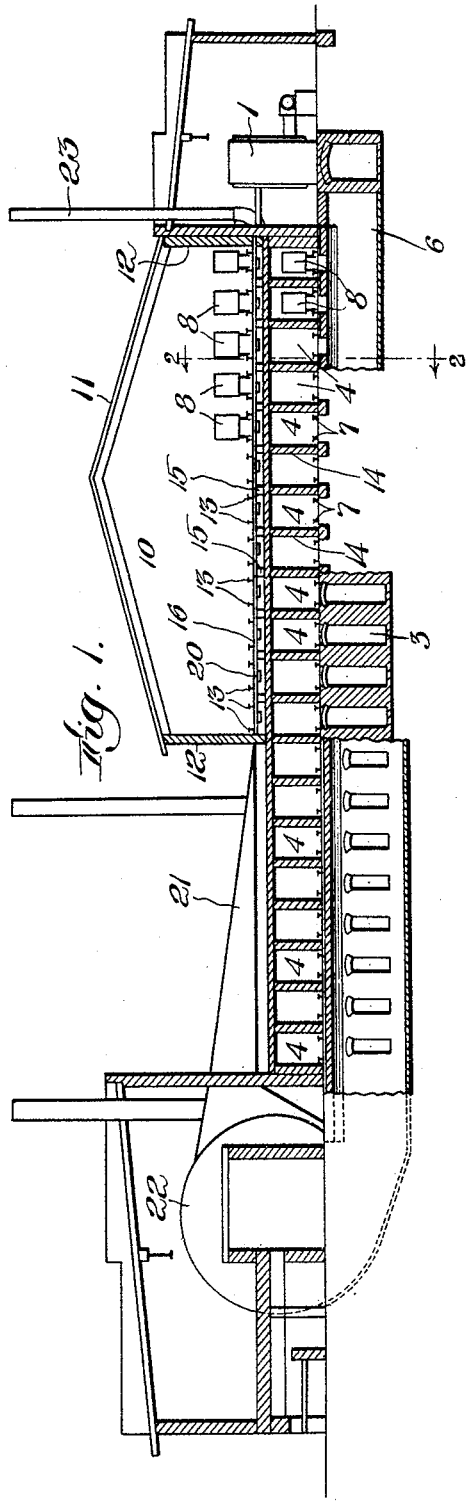
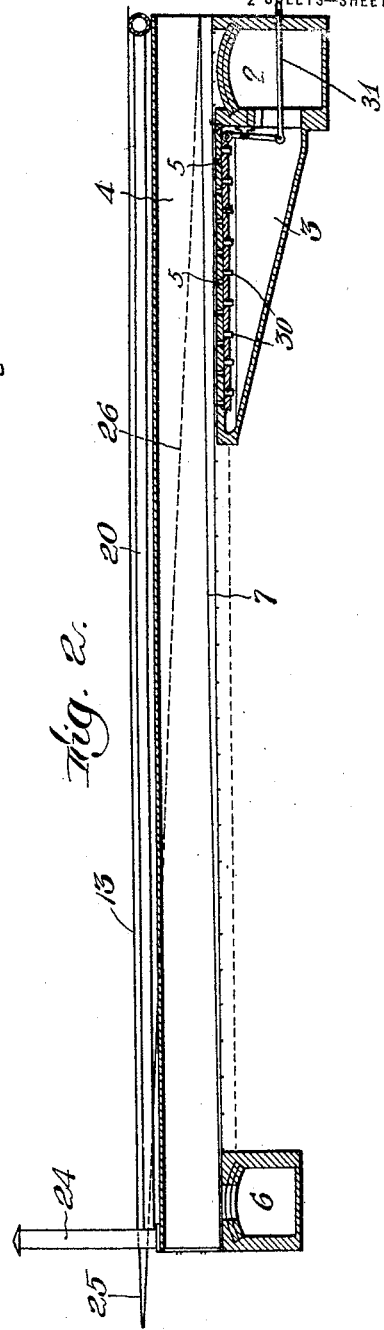
Inventor:
Thomas Lee Myers,
by James R. Hodder
Attorney.

T. L. MYERS.
DEVICE FOR USE IN THE MANUFACTURE OF ARTICLES FROM TENDER CLAY.
APPLICATION FILED MAR. 1, 1918.
1,403,440.
Patented Jan. 10, 1922.
2 SHEETS—SHEET 2.
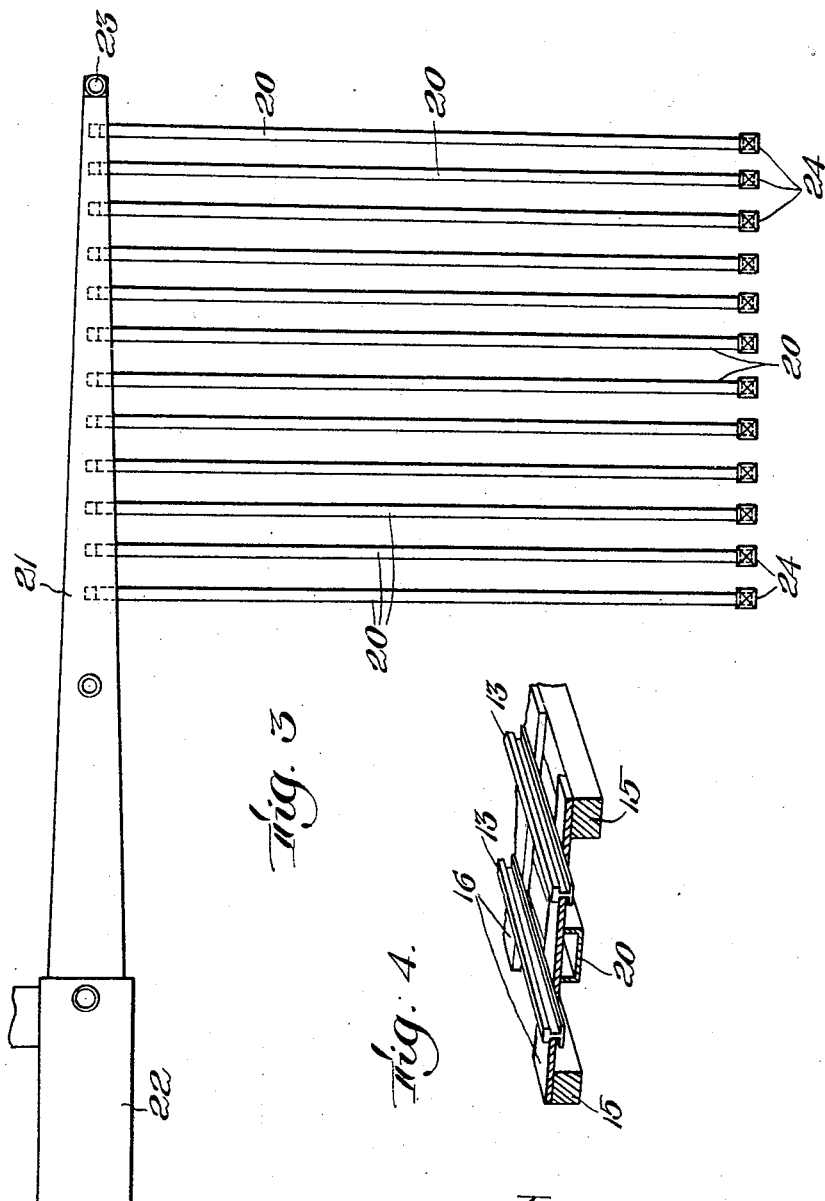
Inventor:
Thomas Lee Myers,
by James R. Hodder,
Attorney.

UNITED STATES PATENT OFFICE.

THOMAS L. MYERS, OF OAKLAND, CALIFORNIA, ASSIGNOR TO AMERICAN EQUIPMENT COMPANY, OF CHICAGO, ILLINOIS, A CORPORATION OF OHIO.

DRIER FOR USE IN THE MANUFACTURE OF ARTICLES FROM TENDER CLAY.

1,403,440.  Specification of Letters Patent.  Patented Jan. 10, 1922.

Application filed March 1, 1918. Serial No. 219,789.

*To all whom it may concern:*

Be it known that I, THOMAS L. MYERS, a citizen of the United States, and resident of Oakland, in the county of Alameda and State of California, have invented an Improvement in Driers for Use in the Manufacture of Articles from Tender Clay, of which the following description, in connection with the accompanying drawings, is a specification, like letters on the drawings representing like parts.

The present invention is an improved process and drying apparatus, employed in the manufacture of clay articles and the object of the invention is to improve and perfect such driers, rendering the same particularly useful in peculiarly difficult clays.

In the successful drying of clays, preliminary to burning, many different problems have to be considered, and each clay bed, as well as different articles made from each clay, frequently require different handling, according to the peculiar characteristics of the clay. Thus many clays may be dried rapidly without damage to the article formed therefrom. The present invention is applicable especially to the drying of brick, utilizing a tunnel type of drier, such for example, as shown in the U. S. patent to Ralph O. Perrott, No. 1,215,849, issued Feb. 13, 1917. In tunnel driers of this type it is preferable to utilize waste heat from an enlarged burning or cooling kiln, although heat from any other suitable source may be employed. The brick or other clay articles are stacked upon cars or trucks, which are started through a tunnel—or a plurality of tunnels, and these cars are gradually and progressively moved through the tunnel, a completely dried carload being taken from one end, while a car of green and undried brick is applied to the other end of each tunnel and thus the entire tunnel is full at all times. A difficulty with this method of tunnel driers which has been experienced in certain types of tender clays, is that the clay articles were subjected to a drying heat which would cause them to check or crack, due to too much heat, or too rapid a flow of air against the material. Such a current of heated air, or indeed, any current of air sufficiently dry to absorb moisture from the green clay articles would frequently cause such articles to dry unevenly and crack, particularly at the early stages of the drying.

Accordingly I provide means which will give a preliminary drying heat to the tender clay articles without any current of air touching them, using, however, a current of air to supply the heat, but confining said heated air current in a heat conducting pipe or duct and radiating the heat therefrom to the clay articles. This method of giving a preliminary drying to the clay articles until they are partially dried or "set", permits the most difficult of clays to be handled without cracking, checking or damage, and enables them to be subsequently run through the usual drying tunnels, such as that shown by the Perrott patent above mentioned. I have discovered that by the application of a very moderate degree of heat without any appreciable air circulation, the most tender clay will be gradually warmed through and the moisture in the center will be drawn by capillary attraction to the outer surface, if the surface is not dried too rapidly, the object being to thus give a slow preliminary heating, resulting in a slow shrinkage of the clay until it has attained an initial set. This method prevents the brick from drying so rapidly as to check or crack but when once thus partly warmed and partially dried or set, the clay, no matter how tender, may then be run through the ordinary tunnel kiln or other drier and subjected to a high degree of heat and rapid air currents. Therefore, an important feature of the process and apparatus herein disclosed is that I may utilize the same in combination with a standard type of drier, such as that mentioned in the Perrott patent, thereby enabling the invention to be commercially employed without the extra expense of an entirely separate installation, building, etc., but permitting it to be used at any time desired with a tunnel drier already established and in use. In carrying out the invention I prefer to employ a drying room or enclosed space which may be fitted on top of the well known American waste heat drier of the type shown by said Perrott patent, laying a plurality of tracks corresponding in position, length and number if desired, with the tunnels in said drier. Then I enclose this space to prevent air currents and to confine the heat to be applied; then I first run the trucks or cars loaded with green brick through this drying room, supplying the heat thereto by deflecting a predetermined amount of heated air through a galvanized iron conduit or duct arranged under each track, thus arranging for the direct radiation of heat—without an appreciable air current, up through the green brick on each car. The cars would be gradually pushed through this heating chamber and then to simplify labor and for further convenience in handling, the cars may be lowered to the ground on the level of the tracks in the tunnel drier, either by an elevator or an inclined railway. The clay articles having been treated by a slow and preliminary warming and initial drying temperature, without the quick action of a rapid circulation of air, during the length of time required for the passage through the extra drying room, are then ready for treatment in the drying tunnels. The passage of cars or trucks through the drying room also is synchronous with the passage of the cars through the tunnels of the regular drier, so that no delay results and my invention is in perfect accord as a unit with the operation of the tunnel drier.

My process and apparatus enables articles to be made of tender clay which it was heretofore impossible to handle without great loss and damage, and in fact it was considered impossible to utilize such tender clays for the manufacture of many articles which my invention enables to be commercially and successfully employed.

Further details of the invention, important advantages and novel combinations of parts will be hereinafter more fully pointed out and claimed.

Referring to the drawings illustrating a preferred embodiment of the invention,

Fig. 1 is a diagrammatic view of my invention applied to an American waste heat drier of the type shown in said Perrott patent:

Fig. 2 is an enlarged longitudinal cross sectional view on the line 2—2 of Fig. 1;

Fig. 3 is a plan view, showing the arrangement of the conduits for the preliminary heating means; and Fig. 4 is a detailed enlarged view, in perspective, showing the arrangement of drier tracks and heat duct.

The tunnel drier here shown is more fully described in said prior patent and consists in a brick and concrete structure with a plurality of tunnels, to which heated air is supplied by a fan or blower 1 through a cross conduit 2 having a plurality of lateral passages as indicated at 3, one under each of the drying tunnels 4, 4, 4, a plurality of passages 5, 5, opening into each tunnel, and suitable valves 30, operated by a sliding arm 31 controlling the current of air therethrough. Tracks 7 are laid through each tunnel, preferably on a slight incline (see Fig. 2) to facilitate passage of the loaded trucks therethrough, such truckloads of bricks being indicated at 8, 8.

Arranged on the top of the main tunnel drier, as shown in Fig. 1, is an enclosed drying room 10 having a roof 11, sides 12, 12, and pairs of tracks 13 laid therethrough parallel with the lower tunnels 4, said tracks 13 being preferably supported over the tunnel partitions 14 by stringers 15 and ties or sleepers 16. Running under each pair of tracks 13 in the drier room 10, preferably secured to the ties, is a galvanized iron duct 20, through which a current of heated air is supplied from a header 21 extending across the tunnel from a fan or blower 22. This supply of heated air may be taken from any desired source, preferably as a portion of the waste heat supplied to the entire brick from a burning or cooling kiln. An outlet 23 at one end of the header is provided, and similar short stacks or outlets 24, 24, may be provided at the end of each duct 20 if desired. The cars of green brick are first run into the drying room 10, and the heat radiated from the iron ducts 20 under each pair of tracks gradually warms the stack of brick at each truck as indicated at 8, 8, giving a preliminary slow warming and drying heat, drawing the moisture slowly and evenly from each brick,—with no greater speed or forcing than said moisture will normally seep through the green clay and thus enable both the outer and inner portions of each brick to be partially dried and set. The cars may then be successively withdrawn from the drying room 10, pushed out on the track portions 25, lowered down the incline 26, illustrated in dotted lines, or otherwise dropped down to the level of the tracks 7 in the regular tunnels 4, the brick being then ready for rapid, thorough and complete drying in the tunnels, being beyond the danger point where such rapid drying or currents of air in the regular tunnels will damage the brick or other articles being dried. It will be understood that the stacks 24 may be removably positioned or laid at one side of the tracks 20 to facilitate admission or removal of the trucks and also that the tunnels are preferably of appropriate length to allow the preliminary drying to be completed during the passage of a truck therethrough.

While I have illustrated and explained my invention as utilizing waste heat or a current of heated air both for the radiation of heat in the drying room 10 and for the final drying operation in the tunnels, it will be appreciated that the fundamental idea of my invention consists in the two steps of first applying a low degree of heat without an appreciable air current, i. e., by radiation from a source of heat supply, such as the conduit 20, steam pipes, or the like;—and then subjecting the clay articles thus given the preliminary drying to a further and final drying action in an air current, either with air currents of different degrees of temperature and velocity, as in said Perrott patent, or in a usual tunnel drier with a continuous current of air throughout its entire length, irrespective of different zones of temperature in said tunnels.

My invention is further described and defined in the form of a claim as follows:

Drying apparatus of the kind described for use in drying articles of tender clay, consisting in a drying room, a plurality of tracks therein to receive a plurality of trucks loaded with clay articles to be dried, means to radiate heat to said clay articles on the trucks without air currents, drying tunnels and means over which said trucks are thereafter moved to the drying tunnels for complete drying in a current of heated air.

In testimony whereof, I have signed my name to this specification, in the presence of two subscribing witnesses.

THOMAS L. MYERS.

Witnesses:
R. F. Crist,
Geo. E. De Golia.